J. F. ECCARD.
STEERING DEVICE FOR VEHICLES.
APPLICATION FILED AUG. 27, 1919.
1,365,897.
Patented Jan. 18, 1921.
2 SHEETS—SHEET 2.
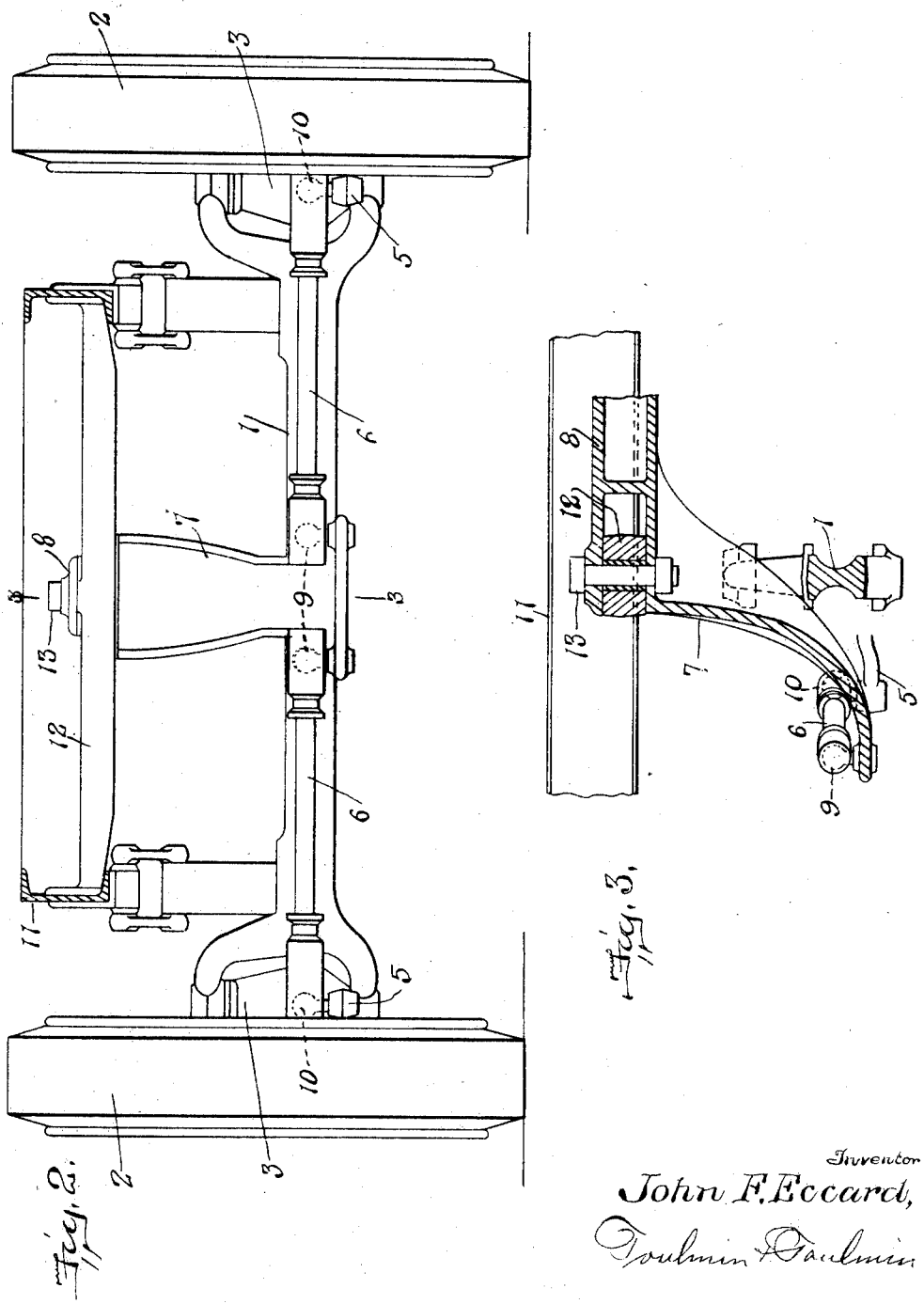
Inventor
John F. Eccard,
Toulmin & Toulmin,
Attorneys

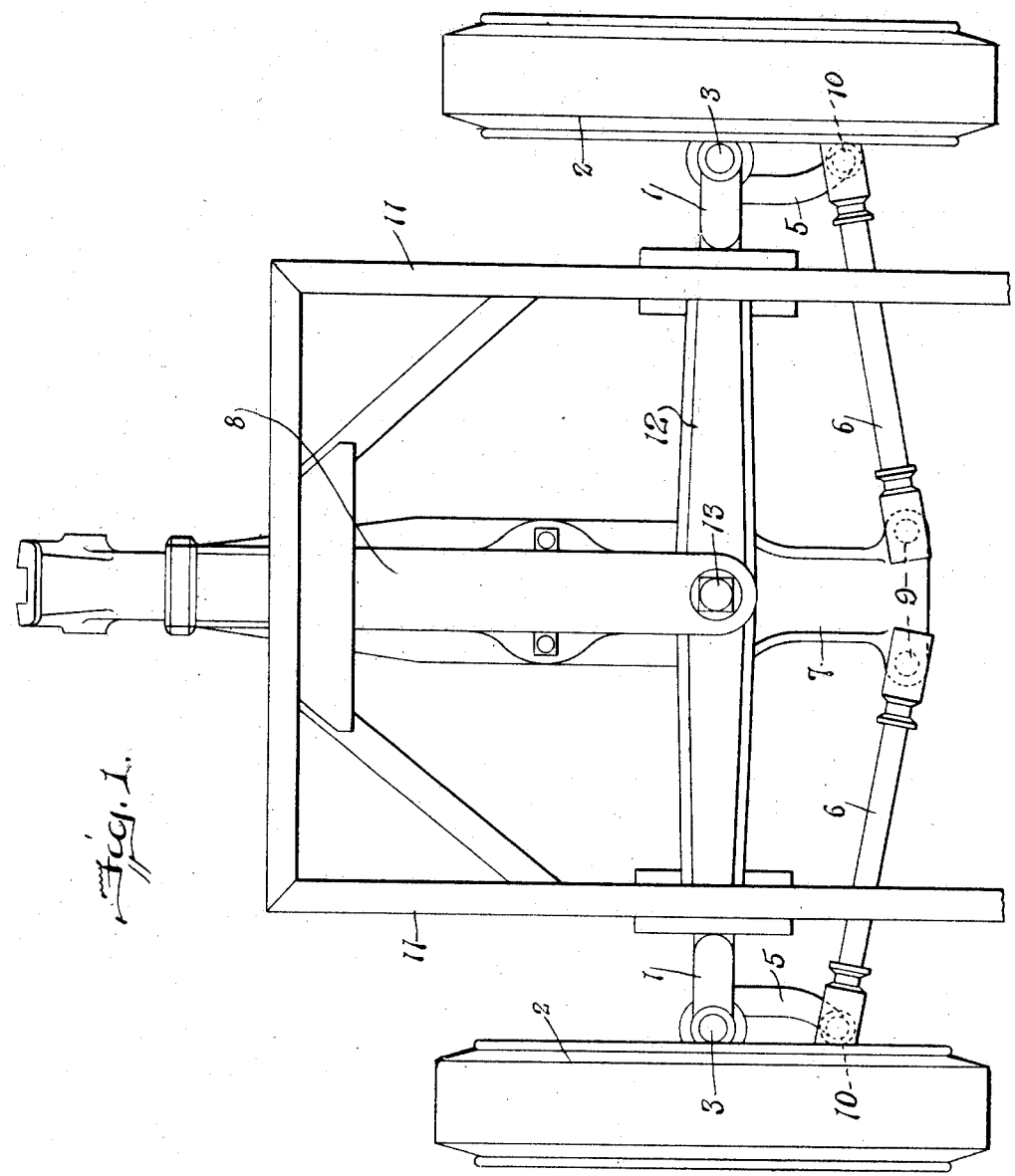

UNITED STATES PATENT OFFICE.

JOHN F. ECCARD, OF TROY, OHIO, ASSIGNOR TO THE TROY WAGON WORKS COMPANY, OF TROY, OHIO, A CORPORATION OF OHIO.

STEERING DEVICE FOR VEHICLES.

1,365,897.  Specification of Letters Patent.  Patented Jan. 18, 1921.

Application filed August 27, 1919. Serial No. 320,088.

*To all whom it may concern:*

Be it known that I, JOHN F. ECCARD, a citizen of the United States, residing at Troy, in the county of Miami and State of Ohio, have invented certain new and useful Improvements in Steering Devices for Vehicles, of which the following is a specification, reference being had therein to the accompanying drawing.

This invention relates to steering devices for vehicles and has for its particular object to provide improved steering mechanism for trailer vehicles, the invention in its present form being especially applicable for use in connection with automobile trailers.

A common difficulty experienced in the operation of trailers of this character consists in deflection of the steering wheels and side and end sway of the frame or body of the trailer, the one condition acting to increase the other, *i. e.*, deflection of the wheels increases side sway and vice versa.

With the constantly increasing use of automobile trailers for various purposes, including the carrying of passengers, the conditions of side sway of the frame and deflection of the wheels is generally recognized by manufacturers and users of trailers as a problem, the solution of which is essential to the future commercialization of trailers, particularly trailers used for carrying passengers.

The problem is essentially one of steering, and the solution thereof must therefore be found by providing steering mechanism of such a character that the conditions referred to, namely, excessive side sway of the frame and deflection or whipping action of the steering wheels, will be eliminated or reduced to a negligible degree.

In the steering mechanism herein shown and described in an improved form the objects of the invention are effectually realized. In the practical application of the invention under normal conditions, it has been found that trailers may be attached to leading automobiles and operated without either side sway of the frame or deflection of the wheels to any material extent; the trailer carrying its load and traveling over the ground with equilibrium equal to that of the leading vehicle.

While the results accomplished by the invention are of far reaching importance in the construction and operation of automobile trailers, the improved steering mechanism mechanically considered is essentially similar, generally speaking to a well known type of steering mechanism. However, in the reorganization of the general arrangement of construction and operation of the mechanism the solution of a problem which is commercially vital to the ultimate larger use of trailers has been found.

The invention consists essentially in pivoting the steering draw bar, by means of which the trailer is attached to the leading vehicle, to the trailer frame substantially as here shown in vertical alinement with the fixed axle of the front truck, in extending the draw bar rearwardly and downwardly to a point substantially beyond an imaginary line intersecting the pivot centers of the steering arms. The drag links in their mean position with a normal load on the trailer, are disposed between the draw bar and steering arms substantially in the horizontal plane of the fixed axle, and are inclined outwardly at their inner ends and connected to the downwardly projecting end of the draw bar by ball and socket joints, the outer ends of the links being connected to the steering arms also, preferably by ball and socket joints. The ball and socket joints, in their double use at both ends of the drag links, act, together with the equalized arc in which the inner ends of the drag links operate in their up and down relation to the draw bar to stabilize the movements of the steering wheels.

From the foregoing statement of the invention its construction and operation will be readily understood from the accompanying drawings in which:

Figure 1 is a plan view of the front truck and a portion of the frame of a trailer to which the present invention has been applied;

Fig. 2 is a rear elevation of the construction shown in Fig. 1, and

Fig. 3 is a detailed vertical sectional view taken on the line 3—3 of Fig. 2.

As here shown the front truck of the trailer consists of the usual fixed axle 1, steering wheels 2 and vertical steering journals 3, the wheels being mounted in the usual manner on horizontal spindles which are preferably integral with the journals 3. Steering arms 5 are also preferably formed integrally with the journals, and are joined at their outer ends by oppositely disposed drag links 6 to the rearwardly extended end 7 of the draw bar 8 by means of ball and socket joints 9, the links being connected to the steering arms also by ball and socket joints 10. A detail of the truck frame is shown at 11 and 12, the draw bar being pivoted to the cross frame 12 by a king bolt 13.

From the foregoing detailed description of the construction, it will be observed that the drag link connections are substantially below the center of rotation of the steering wheels and that the inner ends of the drag links will be moved with the up and down sway of the truck frame and rear end of the draw bar, through an equalizing arc of a circle, that is, the ends of the links will be carried with the variable up and down movements of the draw bar about equally on both sides of a center line extending through the link connections with the steering arms. The ball and socket joints compensate for this movement on both sides of the center line so that the end thrust of the links and any deflection of the wheels resulting therefrom will be eliminated, or at least minimized to a negligible degree, except when abnormal sway of the frame takes place. This also applies to the side sway or torsional movements of the frame as well as to the up and down sway thereof. The neutralizing effect of the equalizing arc through which the inner connections of the drag links are moved and of the ball and socket joints is further increased by establishing the inner joints substantially out of alinement with the center line of the outer joints so that the end thrust of the drag links will not be direct but will move to some extent laterally in the arc of a circle, thereby reducing the end movement imparted to the links.

As above stated these improvements are of first importance in the further commercialization of trailer trucks. While the mechanical arrangement in which the objects of the invention are realized are simple and generally speaking similar to a well known type of steering mechanism, the improved results are nevertheless decisive and mark a long step forward in trailer development.

The present invention is one of several improved constructions in which the objects of the invention are effectually realized and which form the subject matter of separate applications for Letters Patent filed coincident herewith. While the several constructions differ essentially in mechanical form, there is a common underlying principle of invention and a common result in operation.

As far as I am aware these several inventions are the first in which the objects stated are fully realized. It is desired, therefore, to claim the essential features of the improvements broadly as defined and comprehended in the appended claims.

Having thus fully described my invention, what I claim as new and desire to secure by Letters Patent, is:—

1. In a trailer, the combination, with an axle, a frame to carry the load mounted on the axle, a draw bar pivoted thereto and having a downward extension extending into the horizontal plane generally occupied by the axle, of steering knuckles mounted on the axle, wheels mounted on the knuckles, steering arms extending from the knuckles in a plane below the wheel center, and steering rods one connected to each steering arm and both to said draw bar extension, both steering rods being normally within the horizontal plane occupied by the axle.

2. In a trailer, the combination, with an axle, a frame mounted thereon adapted to carry the load, a draw bar pivoted to the frame and having its rear end extended rearwardly of the pivot and downwardly within the general horizontal plane occupied by the axle, of steering knuckles mounted on the axle, wheels mounted on the knuckles, steering arms carried by the knuckles and steering rods one connected to each arm and both connected to the said extension of the draw bar, the position of such rods on the steering arms and the draw bar extension placing them when in normal position within the horizontal plane occupied by the axle, the connection between the steering rods and draw bar extension being at points in the rear of a line extending from the connection of the steering rods with the steering arms, for the purpose set forth.

In testimony whereof I affix my signature.

JOHN F. ECCARD.